(12) United States Patent
Khatiwada et al.

(10) Patent No.: US 12,403,460 B2
(45) Date of Patent: *Sep. 2, 2025

(54) PHOTOCATALYTIC REACTOR HAVING MULTIPLE PHOTOCATALYTIC REACTOR CELLS

(71) Applicant: Syzygy Plasmonics Inc., Houston, TX (US)

(72) Inventors: Suman Khatiwada, Houston, TX (US); Trevor William Best, Houston, TX (US)

(73) Assignee: Syzygy Plasmonics Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,460

(22) Filed: Feb. 5, 2024

(65) Prior Publication Data

US 2024/0216901 A1   Jul. 4, 2024

Related U.S. Application Data

(63) Continuation of application No. 16/625,527, filed as application No. PCT/US2018/039476 on Jun. 26, 2018, now Pat. No. 11,890,606.
(Continued)

(51) Int. Cl.
*B01J 35/39*   (2024.01)
*B01J 19/00*   (2006.01)
(Continued)

(52) U.S. Cl.
CPC ............ *B01J 35/39* (2024.01); *B01J 19/0013* (2013.01); *B01J 19/0053* (2013.01);
(Continued)

(58) Field of Classification Search
CPC .... B01J 35/39; B01J 19/0013; B01J 19/0053; B01J 19/123; B01J 19/127; B01J 19/128;
(Continued)

(56) References Cited

U.S. PATENT DOCUMENTS 3,554,887 A   1/1971   Feehs
4,517,063 A   5/1985   Cirjak
(Continued)

FOREIGN PATENT DOCUMENTS

AU   2018286458 B2   7/2020
BR   PI0701773 A2   12/2008
(Continued)

OTHER PUBLICATIONS

Alfano O.M. et al., "Photocatalysis in Water Environments Using Artificial and Solar Light," Catalysis Today, 2000; 58:199-230.
(Continued)

*Primary Examiner* — Xiuyu Tai
(74) *Attorney, Agent, or Firm* — GrowIP Law Group LLC

(57) ABSTRACT

The present disclosure relates generally to reactor systems that include (a) a housing having an interior surface that may be at least partially reflective, (b) at least one reactor cell disposed within an interior of the housing, the at least one reactor cell including an enclosure and a plasmonic photocatalyst on a catalyst support disposed within the at least one enclosure, where the enclosure is optically transparent and includes at least one input for a reactant to enter the at least one cell and at least one output for a reformate to exit the at least one cell and (c) at least one light source disposed within the interior of the housing and/or external to the housing.

8 Claims, 8 Drawing Sheets

Related U.S. Application Data

(60) Provisional application No. 62/586,675, filed on Nov. 15, 2017, provisional application No. 62/525,301, filed on Jun. 27, 2017, provisional application No. 62/525,305, filed on Jun. 27, 2017, provisional application No. 62/525,380, filed on Jun. 27, 2017.

(51) Int. Cl.
*H01M 14/00* (2006.01)
*B01J 19/12* (2006.01)

(52) U.S. Cl.
CPC .......... *H01M 14/005* (2013.01); *B01J 19/123* (2013.01); *B01J 19/127* (2013.01); *B01J 19/128* (2013.01); *B01J 2219/0877* (2013.01); *B01J 2219/0892* (2013.01)

(58) Field of Classification Search
CPC ........ B01J 2219/0877; B01J 2219/0892; B01J 23/10; B01J 21/063; B01J 37/0248; B01J 23/50; B01J 23/52; B01J 23/06; B01J 23/22; B01J 35/19; B01J 27/20; B01J 35/23; B01J 35/505; B01J 37/03; B01J 35/30; B01J 27/14; B01J 23/002; B01J 2235/00; B01J 35/45; B01J 21/04; B01J 35/393; B01J 35/397; B01J 23/58; B01J 23/8946; B01J 35/33; B01J 2540/66; B01J 2219/00635; H01M 14/005; C01G 23/047; C07C 45/002; C07C 47/06; C01B 2203/1041; C01B 2203/0277; C01B 3/22; C01B 2203/1217; C01B 2203/1229; C01B 5/00; C01B 32/40; C01B 2203/1241; C01B 2203/1076; C01B 2203/1082; C01B 4/00; C01B 3/40; C01B 21/02; C01B 3/047; C01B 2203/0238; B01D 53/885; B01D 53/8628; B01D 2255/802; B01D 2255/20707; B01D 2259/804; B01D 2257/60; B01D 2257/602; B01D 2257/91; B01D 2255/9202; C02F 2201/3222; C02F 2201/3227; C02F 1/325; C02F 1/725; C10G 2/35; C10G 2/331; C10K 3/026; Y02P 20/52; Y02E 60/36

See application file for complete search history.

(56) References Cited

U.S. PATENT DOCUMENTS

| | | |
|---|---|---|
| 4,788,040 A | 11/1988 | Campagnolo et al. |
| 5,030,607 A | 7/1991 | Colmenares |
| 5,298,226 A | 3/1994 | Nowobilski |
| 5,501,801 A | 3/1996 | Zhang et al. |
| 5,505,912 A | 4/1996 | Hallett |
| 5,538,931 A | 7/1996 | Heinrichs et al. |
| 5,562,822 A | 10/1996 | Furness, Jr. et al. |
| 6,217,834 B1 | 4/2001 | Hosein et al. |
| 6,248,217 B1 | 6/2001 | Biswas et al. |
| 6,979,362 B2 | 12/2005 | Jackson |
| 8,506,886 B2 | 8/2013 | Owen et al. |
| 8,753,579 B2 | 6/2014 | Sattler et al. |
| 8,999,283 B1 | 4/2015 | Kuhn et al. |
| 9,404,797 B2 | 8/2016 | Walters |
| 10,766,024 B2 | 9/2020 | Halas et al. |
| 2005/0231711 A1 | 10/2005 | Benoit et al. |
| 2008/0299017 A1 | 12/2008 | Sattler et al. |
| 2009/0145855 A1* | 6/2009 | Day ................. C02F 1/325 210/748.14 |
| 2009/0321244 A1 | 12/2009 | Smith et al. |
| 2009/0321365 A1 | 12/2009 | Eriksson et al. |
| 2010/0137131 A1 | 6/2010 | Awazu et al. |
| 2010/0221166 A1 | 9/2010 | Muggli |
| 2012/0168300 A1 | 7/2012 | Kolios et al. |
| 2012/0228236 A1 | 9/2012 | Hawkins et al. |
| 2012/0279872 A1 | 11/2012 | Chen et al. |
| 2013/0008857 A1 | 1/2013 | Foster |
| 2013/0026027 A1 | 1/2013 | Bae et al. |
| 2013/0121889 A1 | 5/2013 | Usami |
| 2013/0168228 A1* | 7/2013 | Ozin ................. B01J 37/0215 977/773 |
| 2014/0272623 A1 | 9/2014 | Jennings |
| 2016/0193595 A1 | 7/2016 | Nagpal et al. |
| 2016/0340593 A1 | 11/2016 | Macdonnell et al. |
| 2016/0367968 A1 | 12/2016 | Guerrero et al. |
| 2017/0173350 A1 | 6/2017 | Bourke, Jr. et al. |
| 2017/0217791 A1 | 8/2017 | McNulty |
| 2018/0147313 A1 | 5/2018 | Cheng et al. |
| 2018/0333712 A1 | 11/2018 | Halas et al. |
| 2019/0047856 A1* | 2/2019 | Nadeem ............... C01G 23/047 |
| 2021/0023255 A1 | 1/2021 | Keith |
| 2021/0178377 A1 | 6/2021 | Khatiwada et al. |
| 2021/0178378 A1 | 6/2021 | Khatiwada et al. |

FOREIGN PATENT DOCUMENTS

| | | |
|---|---|---|
| CN | 1941485 A | 4/2007 |
| CN | 1962036 A | 5/2007 |
| CN | 103861542 A | 6/2014 |
| CN | 104056546 A | 9/2014 |
| CN | 104069722 A | 10/2014 |
| CN | 105289685 A | 2/2016 |
| ES | 2577904 A2 | 7/2016 |
| GB | 2552171 A | 1/2018 |
| JP | 2002166176 A | 6/2002 |
| JP | 2002210333 A | 7/2002 |
| JP | 2003340241 A | 12/2003 |
| JP | 2005169298 A | 6/2005 |
| JP | 2006107956 A | 4/2006 |
| JP | 2006256901 A | 9/2006 |
| JP | 2007061730 A | 3/2007 |
| JP | 2007308318 A | 11/2007 |
| JP | 2008264611 A | 11/2008 |
| JP | 4589943 B2 | 12/2010 |
| JP | 2011110492 A | 6/2011 |
| JP | 2016530069 A | 9/2016 |
| KR | 101712373 B1 | 3/2017 |
| KR | 101725059 B1 | 4/2017 |
| MX | 2011000963 A | 5/2011 |
| RU | 2386474 C1 | 4/2010 |
| RU | 2437715 C1 | 12/2011 |
| WO | 2012017637 A1 | 2/2012 |
| WO | 2012031357 A1 | 3/2012 |
| WO | 2015002944 A2 | 1/2015 |
| WO | 2015109217 A1 | 7/2015 |
| WO | 2016030753 A1 | 3/2016 |
| WO | 2016052987 A1 | 4/2016 |
| WO | 2018011550 A1 | 1/2018 |
| WO | 2018153630 A1 | 8/2018 |
| WO | 2018231398 A9 | 1/2019 |
| WO | 2019005777 A1 | 1/2019 |
| WO | 2019005779 A1 | 1/2019 |
| WO | 2020146799 A1 | 7/2020 |
| WO | 2020146813 A1 | 7/2020 |

OTHER PUBLICATIONS

De Lasa H. et al., "Photocatalytic Reaction Engineering," Springer, Boston, MA, 2005.
International Preliminary Report on Patentability for Int. App. No. PCT/US2018/032375, issued Nov. 12, 2019.
International Search Report and Written Opinion for Int. App. No. PCT/US2018/032375, mailed Apr. 11, 2019.
International Search Report and Written Opinion for Int. App. No. PCT/US2018/039470, mailed Sep. 7, 2018.
International Search Report and Written Opinion for Int. App. No. PCT/US2018/039476, mailed Sep. 7, 2018.
Kachaev A.A. et al. "Optically Transparent Ceramic (Review)". Glass Ceram 73, 117-123 (2016).

(56) References Cited

OTHER PUBLICATIONS

Li et al. Hydrogen Evolution by Photocatalytic Steam Reforming of Methane over PT/TiO2. Acta Phys.-Chim. Sin., 2012, 28 (2) 450-456. (English Abstract).
Mozia S., "Photocatalytic Membrane Reactors (PMRs) in Water and Wastewater Treatment: A Review," Sep. Purif. Technol., 2010, 73 (2), 71-91.
Nair V. et al., "Thermo-Photocatalysis: Environmental and Energy Applications," ChemSusChem, 2019, 12 (10), 2098-2116.
Paolo Ciambelli et al, "Improved Performances of a Fluidized Bed Photoreactor by a Microscale Illumination System", International Journal of Photoenergy, vol. 2009, Jan. 1, 2009 (Jan. 1, 2009), pp. 1-7.
Pasquali M. et al., "Radiative Transfer in Photocatalytic Systems," AIChE J., 1996, 42 (2), 532-537.
Robatjazi H. et al. "Plasmon-Driven Carbon-Fluorine (C(Sp 3)-F) Bond Activation with Mechanistic Insights into Hot-Carrier-Mediated Pathways." Nat. Catal. 2020, 3 (7), 563-73.
Shou et al. "Synthesis and characterization of a nanocomposite of goethite nanorods and reduced graphene oxide for electrochemical capacitors." J. Solid State Chemistry, 2012, vol. 185, 191-197.
Stankiewicz A. "Energy Matters: Alternative Sources and Forms of Energy for Intensification of Chemical and Biochemical Processes." Chem. Eng. Res. Des., 84 (7A), 511-521 (2006).
Su Y. et al., "Photochemical Transformations Accelerated in Continuous-Flow Reactors: Basic Concepts and Applications," Chem.—A Eur. J., 2014, 20 (34), 10562-10589.
Swearer, Dayne F., et al., "Heterometallic antenna-reactor complexes for photocatalysis" PNAS, vol. 113, No. 32, Aug. 9, 2016.
Van Gerven T. et al., "A Review of Intensification of Photocatalytic Processes," Chem. Eng. Process. Process Intensif., 2007, 46 (9 SPEC. ISS.), 781-789.
Van Gerven T. et al., "Structure, Energy, Synergy, Time." Ind. Eng. Chem. Res., 2009, 2465-2474.
Xiao, et al. "Visible light-driven cross-coupling reactions at lower temperatures using a photocatalyst of palladium and gold alloy nanoparticles." ACS Catal., 2014, vol. 4, 1725-1734.
Zacarias Silvia Mercedes et al: "Design and performance evaluation of a photocatalytic reactor for indoor air disinfection", Environmental Science and Pollution Research, Springer Berlin Heidelberg, Berlin/Heidelberg, vol. 28, No. 19, Nov. 21, 2020, pp. 23859-23867.
Zhou L. et al., "Light-Driven Methane Dry Reforming with Single Atomic Site Antenna-Reactor Plasmonic Photocatalysts," Nat. Energy, 2020, 5 (1), 61-70.
Zhou L. et al., "Quantifying Hot Carrier and Thermal Contributions in Plasmonic Photocatalysis," Science, Oct. 5, 2018, 69-72.

\* cited by examiner

PHOTOCATALYTIC REACTOR HAVING MULTIPLE PHOTOCATALYTIC REACTOR CELLS

RELATED APPLICATIONS

The present application is a continuation of and incorporates by reference U.S. patent application Ser. No. 16/625,527, filed on Dec. 20, 2019, which is a U.S. national phase application under 35 U.S.C. § 371 of International Application No. PCT/2018/039476, filed on Jun. 26, 2018, which claims priority to and incorporates by reference the entireties of the following U.S. patent applications: U.S. Provisional Patent Application No. 62/525,301, filed on Jun. 27, 2017, U.S. Provisional Patent Application No. 62/525,305, filed on Jun. 27, 2017, U.S. Provisional Patent Application No. 62/525,380, filed on Jun. 27, 2017, and U.S. Provisional Patent Application No. 62/586,675, filed on Nov. 15, 2017.

In addition, the entireties of the following patent applications are incorporated by reference herein: International Patent Application No. PCT/US18/32375, filed on May 11, 2018, U.S. patent application Ser. No. 15/977,843, filed on May 11, 2018, and International Patent Application No. PCT/2018/039470, titled "Photocatalytic Reactor Cell," filed on Jun. 26, 2018.

BACKGROUND OF THE DISCLOSURE

Field of the Disclosure

The present disclosure relates generally to reactor systems having at least one light source and reactor cells, each including an optically transparent enclosure and one or more plasmonic photocatalysts on a catalyst support disposed within the enclosure.

Technical Background

Industrial processes depend extensively on heterogeneous catalysts for chemical production and mitigation of environmental pollutants. These processes often rely on metal nanoparticles dispersed into high surface area support materials to both maximize catalytically active surface area and for the most cost-effective use of the catalysts (such as palladium, platinum, ruthenium, or rhodium). The catalytic processes utilizing transition metal nanoparticles are often energy intensive, relying on high temperatures and pressures to maximize catalytic activity. Thus, there remains a need for an efficient and cost-effective catalytic system.

SUMMARY OF THE DISCLOSURE

The inventors have found efficient reactor systems that utilize an artificial or natural light source. The reactor systems of the disclosure can be designed to maximize absorption of one or more target wavelengths and/or catalyze a desired chemical reaction. As a result, the reactor systems disclosed herein may be cost effective and environmentally sustainable solutions for many current industrial processes.

Thus, in one aspect, the present disclosure provides a reactor system that includes a housing and at least one reactor cell disposed within an interior of the housing. The at least one reactor cell comprising an enclosure and a plasmonic photocatalyst on a catalyst support disposed within the at least one enclosure, wherein the enclosure is optically transparent and comprises at least one input for a reactant to enter the at least one cell and at least one output for a reformate to exit the at least one cell. When at least one light source is applied, the reactor cell is configured to transform the reactant into the reformate.

In another aspect, the present disclosure provides a solar concentrator and a photocatalytic reactor cell positioned relative to the solar concentrator to increase an incidence of electromagnetic radiation on the photocatalytic reactor cell.

In yet another aspect, the present disclosure provides a method for transforming at least one reactant into at least one reformate. The method includes (a) distributing at least one reactant into a plurality of reactor cells disposed within a housing, where each reactor cell comprises an optically transparent enclosure and a plasmonic photocatalyst on a catalyst support disposed within the optically transparent enclosure, (b) illuminating, via at least one light source, an interior of the housing to cause the plurality of reactor cells to transform at least one reactant into at least one reformate, and (c) accumulating the at least one reformate from the plurality of reactor cells.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity and/or illustrated as simplistic representations in order to promote comprehension. The drawings illustrate one or more embodiment(s) of the disclosure, and together with the description, serve to explain the principles and operation of the disclosure.

DETAILED DESCRIPTION

Figure 1A:
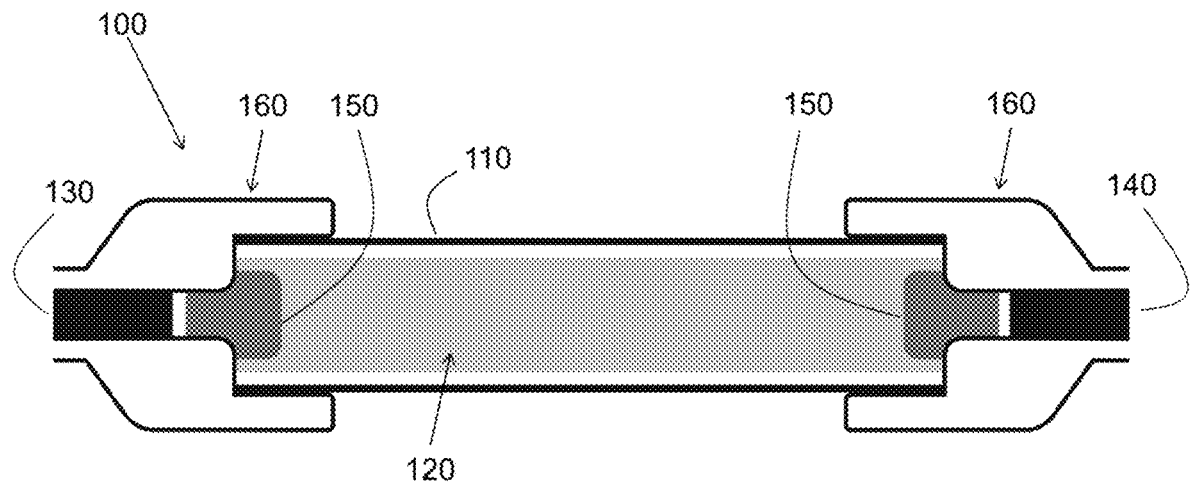
FIG. 1A is a cross-sectional side view of a reactor cell according to one embodiment of the disclosure.

Before the disclosed systems and methods are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other component, feature, element, or step or group of components, features, elements or steps.

As used in the specification and the appended claims, the singular forms "a," "an" and "the" include plural referents unless the context clearly dictates otherwise.

As used herein, the term "coupling" includes physical, electronic, thermal, or optical coupling of one element to another element.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified. A weight percent (weight %, also as wt %) of a component, unless specifically stated to the contrary, is based on the total weight of the composition in which the component is included (e.g., on the total amount of the catalyst material).

In view of the present disclosure, the processes and active materials described herein can be configured by the person of ordinary skill in the art to meet the desired need. In general, the disclosed systems, methods, and apparatus provide improvements in photocatalysis processes and materials. In general, the present disclosure provides a reactor system that includes a housing having an interior surface that may be at least partially reflective. The reactor system also includes at least one reactor cell disposed within an interior of the housing. The at least one reactor cell includes an enclosure and a plasmonic photocatalyst on a catalyst support disposed within the at least one enclosure. The enclosure of the cell is optically transparent and includes at least one input for a reactant to enter the at least one cell and at least one output for a reformate to exit the at least one cell. The reactor system further includes at least one light source, which may be disposed within the interior of the housing and/or external to the housing.

Figure 2A:
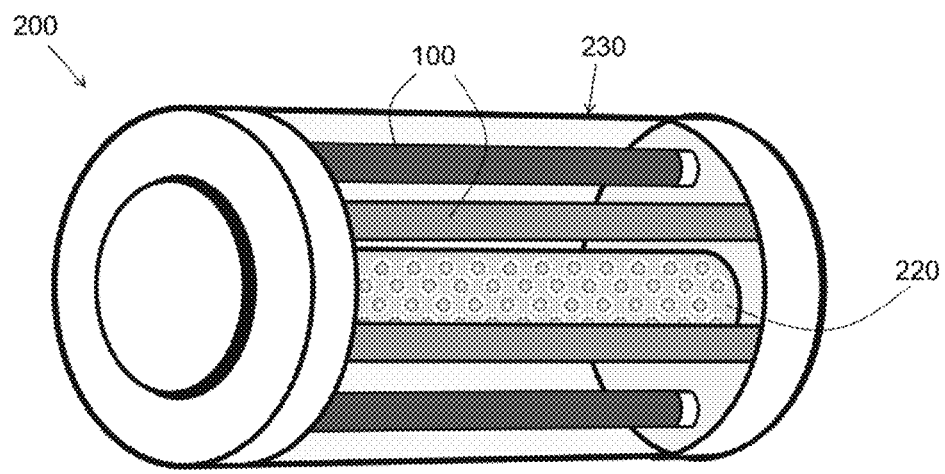
FIG. 2A is a perspective side view of a configuration of a reactor system according to one embodiment of the disclosure.
Figure 2B:
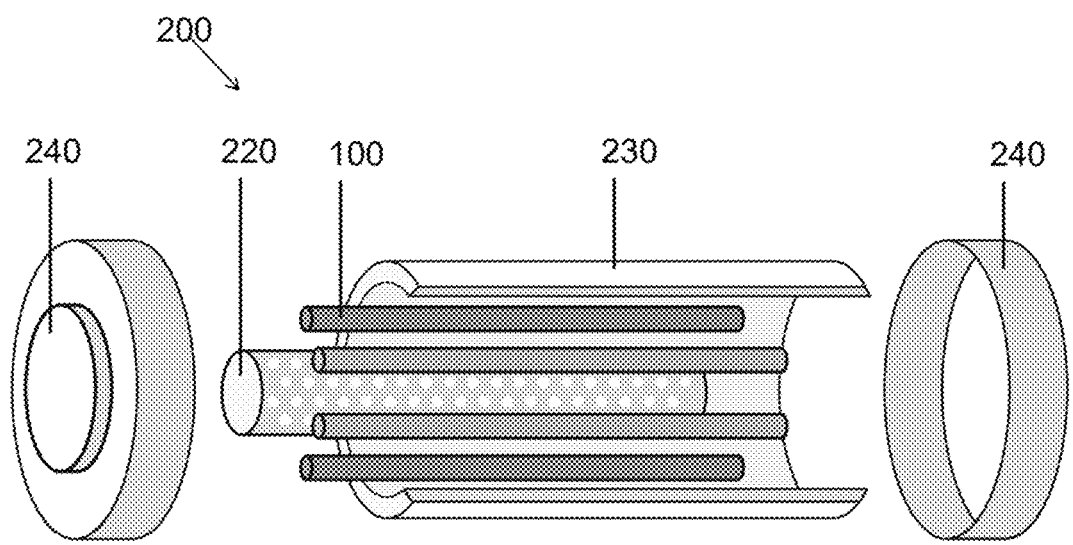
FIG. 2B is an exploded perspective side view of a configuration of a reactor system according to the embodiment of FIG. 2A.
Figure 3A:
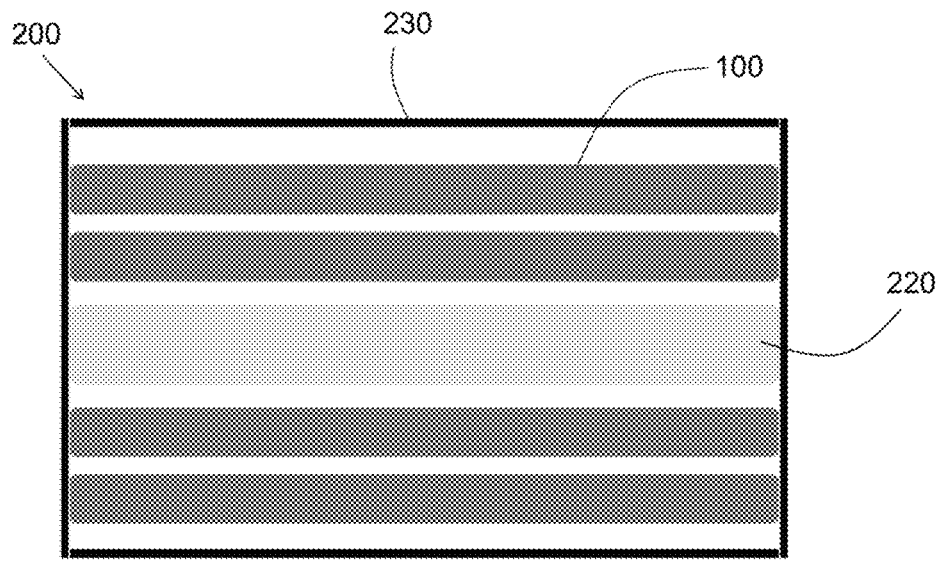
FIG. 3A is cross-sectional side view of an example configuration of the reactor cell according to one embodiment of the disclosure.
Figure 3B:
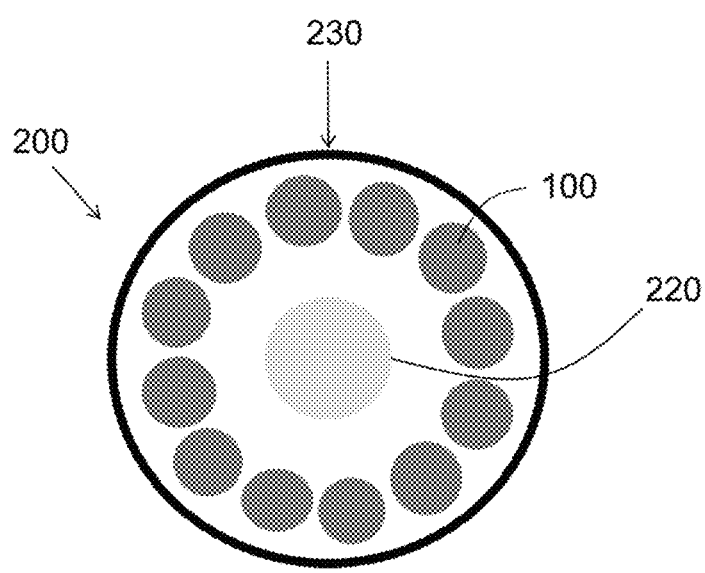
FIG. 3B is a cross-sectional end view of an example configuration of the reactor cell according to the embodiment of FIG. 3A.

In general, the reactor system is designed to allow for illumination of the reactor cells with a light source, which itself may be comprised of one or more individual light sources. One embodiment of the reactor system of the disclosure is shown in cross-sectional view in FIG. 2A. The same reactor system 200 elements are also shown in exploded view in FIG. 2B. In this embodiment, at least one reactor cell 100 and at least one light source 220 are disposed within reactor housing 230. The reactor system 200 further comprises reactor fittings 240 that may be further coupled to another system (e.g., another system used for reforming reactions). Several other embodiments of the reactor system of the disclosure are shown in FIGS. 3A-3B, 4A-4B, and 5A-5B. In some embodiments, as shown in FIGS. 7A-7D, the reactor system may have several light sources 220 and/or thermal management features 250.

In one embodiment, the reactor fittings 240 may comprise a reactor fluid distributor (for input) and a reactor fluid accumulator (for output). Any reactor fluid distributor or accumulator known in the art might be used. For example, the reactor fluid distributor or accumulator may be similar to those disclosed in U.S. Pat. No. 4,788,040 (incorporated by reference herein), where the orifices of the reactor fluid distributor and accumulator will match to the arrangement of the reactor cells. In some embodiments, the interior surfaces (i.e. facing the reactor cells) of the reactor fluid distributor and/or accumulator may be reflective.

In one embodiment, the at least one light source may be elongated and arranged coaxially along a central long axis of the housing. In further embodiments, the at least one light source may include at least one LED, metal halide bulb, high pressure sodium bulb, xenon lamp, incandescent bulb, fluorescent bulb, halogen bulb, HID, laser or combination thereof. In a further embodiment, the at least one light source may include at least one corn cob LED bulb having a plurality of LEDs arranged along its length.

In another embodiment, the at least one reactor cell may be elongated and may have a circular cross-section. In this embodiment, the at least one reactor cell may be arranged parallel to or even coaxial with the at least one light source. For example, in a further embodiment, the at least one light source may be arranged coaxially in the housing and the at least one reactor cell includes a plurality of reactor cells arranged surrounding the at least one light source.

In one embodiment, the housing has a circular or a polygonal cross-section. In one embodiment, the housing may have an inner diameter ranging from about 12 cm to about 128 cm. The housing may further have an inner diameter ranging from about 24 cm to about 72 cm. Each of the plurality of reactor cells has a diameter ranging from about 2 cm to about 4 cm, according to one embodiment. The plurality of reactor cells ranges in number from 12 cells to 24 cells, for example.

Figure 4A:
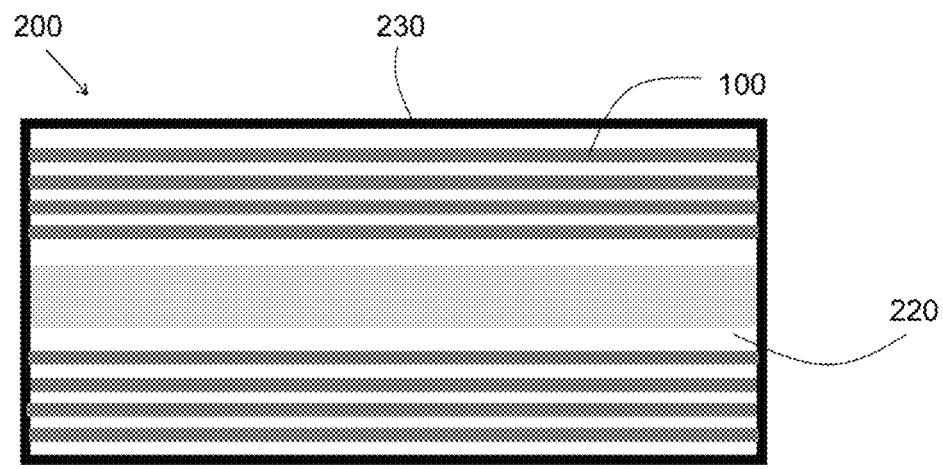
FIG. 4A is a cross-sectional side view of an example configuration of the reactor cell according to one embodiment of the disclosure.
Figure 4B:
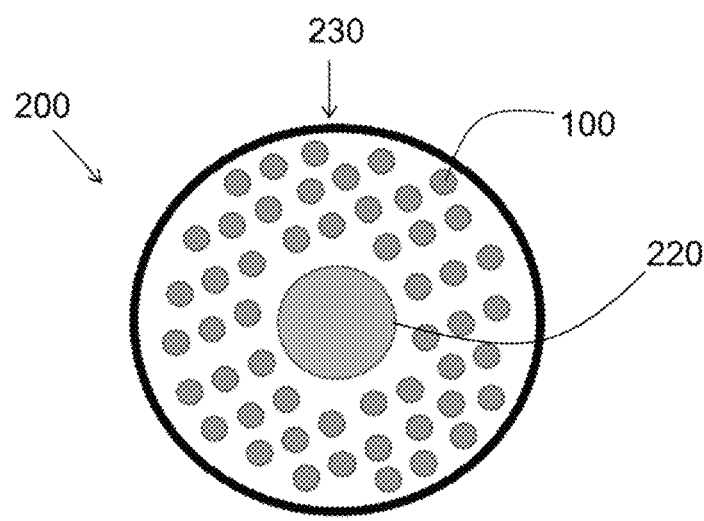
FIG. 4B is a cross-sectional end view of an example configuration of the reactor cell according to the embodiment of FIG. 4A.
Figure 5A:
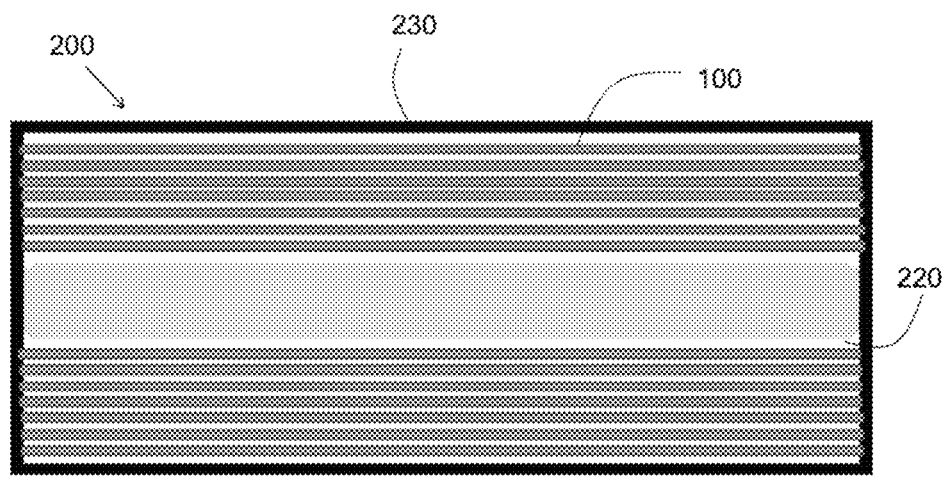
FIG. 5A is a cross-sectional side view of an example configuration of the reactor cell according to one embodiment of the disclosure.
Figure 5B:
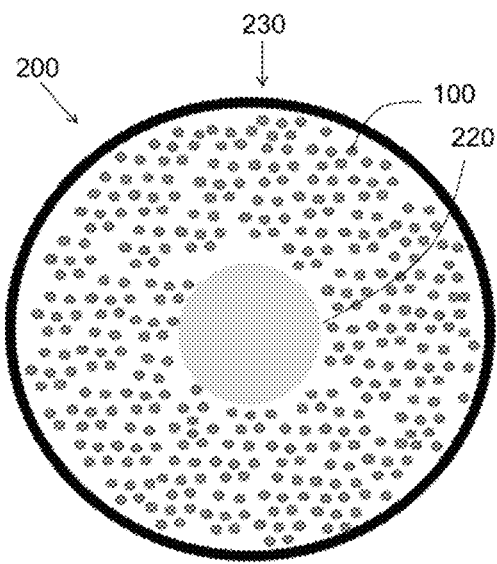
FIG. 5B is a cross-sectional end view of an example configuration of the reactor cell according to the embodiment of FIG. 5A.

In another embodiment, the housing may have an inner diameter ranging from about 12 cm to about 18 cm. As shown in FIGS. 4A-4B, each of the plurality of reactor cells may have a diameter of about 2 cm, and the plurality of reactor cells may range in number from 50 cells to 100 cells, for example. In a further embodiment, shown in FIGS. 5A-5B, the plurality of reactor cells may each have a diameter of about 1 cm, and the plurality of reactor cells includes at least 100 reactor cells, for example.

Figure 7A:
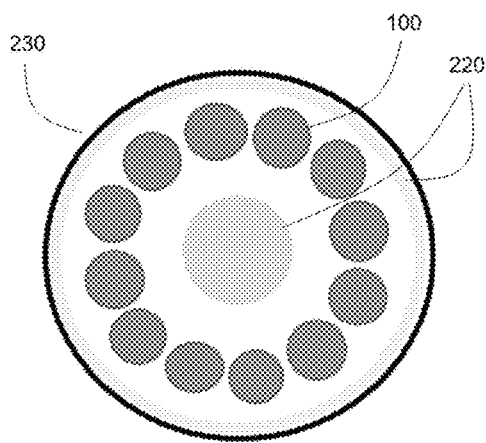
FIG. 7A is a cross-sectional end view of an example configuration of a reactor cell system according to one embodiment of the disclosure.
Figure 7B:
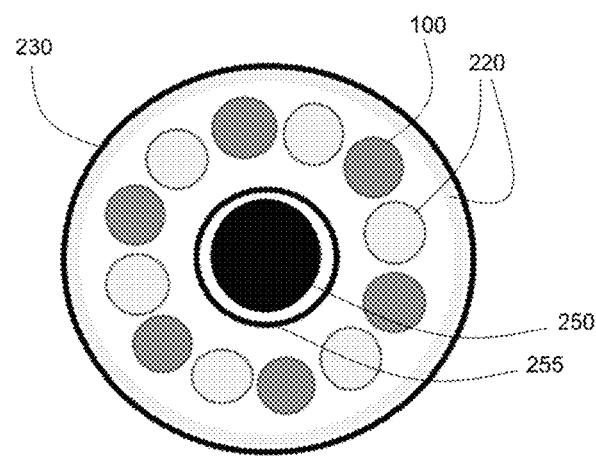
FIG. 7B is a cross-sectional end view of an example configuration of a reactor cell system according to one embodiment of the disclosure.
Figure 7C:
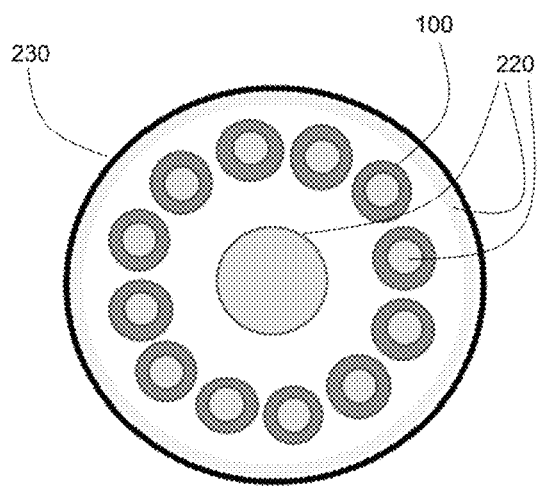
FIG. 7C is a cross-sectional end view of an example configuration of a reactor cell system according to one embodiment of the disclosure.
Figure 7D:
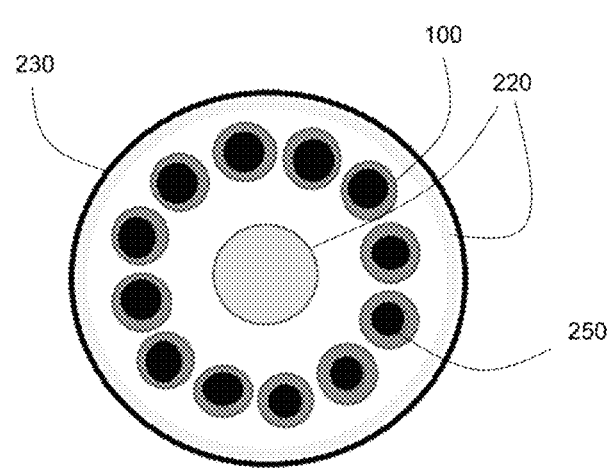
FIG. 7D is a cross-sectional end view of an example configuration of a reactor cell system according to one embodiment of the disclosure.

In one embodiment, shown in FIG. 7B, the reactor system includes at least one shaft 255 that is arranged coaxially within the housing. The at least one shaft may have a reflective exterior surface. In this embodiment, a plurality of reactor cells and a plurality of light sources are arranged parallel to and surrounding the at least one shaft, such as in an alternating arrangement. In a further embodiment, the at least one shaft 255 may have a cavity having an input at a first end and an output at a second end such that the at least one shaft 255 is configured to permit fluid to flow there through for thermal management of the reactor system, in which case the fluid would constitute at least part of the thermal management feature 250. In an alternative embodiment, the at least one shaft comprises a metal rod and or metal wires configured for heat conduction.

In another embodiment, the reactor system has a housing with an interior surface coupled to at least one light source. The reactor system further has at least one reactor cell disposed within an interior of the housing. The at least one reactor cell includes an enclosure and a plasmonic photocatalyst on a catalyst support disposed within the at least one enclosure. The enclosure is optically transparent and includes at least one input for a reactant to enter the at least one reactor cell and at least one output for a reformate to exit the at least one reactor cell. The reactor system may include at least one shaft having a reflective exterior surface that is disposed within the housing. In one embodiment, the at least one shaft is arranged coaxially within the housing.

In some embodiments, the light source is a solar light source. For example, the light source may include electromagnetic radiation from the sun, another star, or any other light-emitting celestial body. In such a case, the reactor system may comprise a solar concentrator to provide light energy to a photocatalytic reactor cell, which may be part of a reactor system comprising many such photocatalytic reactor cells.

A reactor system utilizing a solar light source may comprise a solar concentrator, such as a reflector or refractor, and a photocatalytic reactor cell positioned relative to the solar concentrator to increase an incidence of electromagnetic radiation on the photocatalytic reactor cell. According to one example, the solar concentrator comprises a reflector, such as a parabolic mirror trough, a parabolic dish, a Fresnel reflector, a Compact Linear Fresnel Reflector (CLFR), a solar power tower, a flat plate collector, an evacuated tube collector, or another type of reflector. According to another example, the solar concentrator comprises a refractor, such as a lens (e.g. a Fresnel lens).

Figure 8:
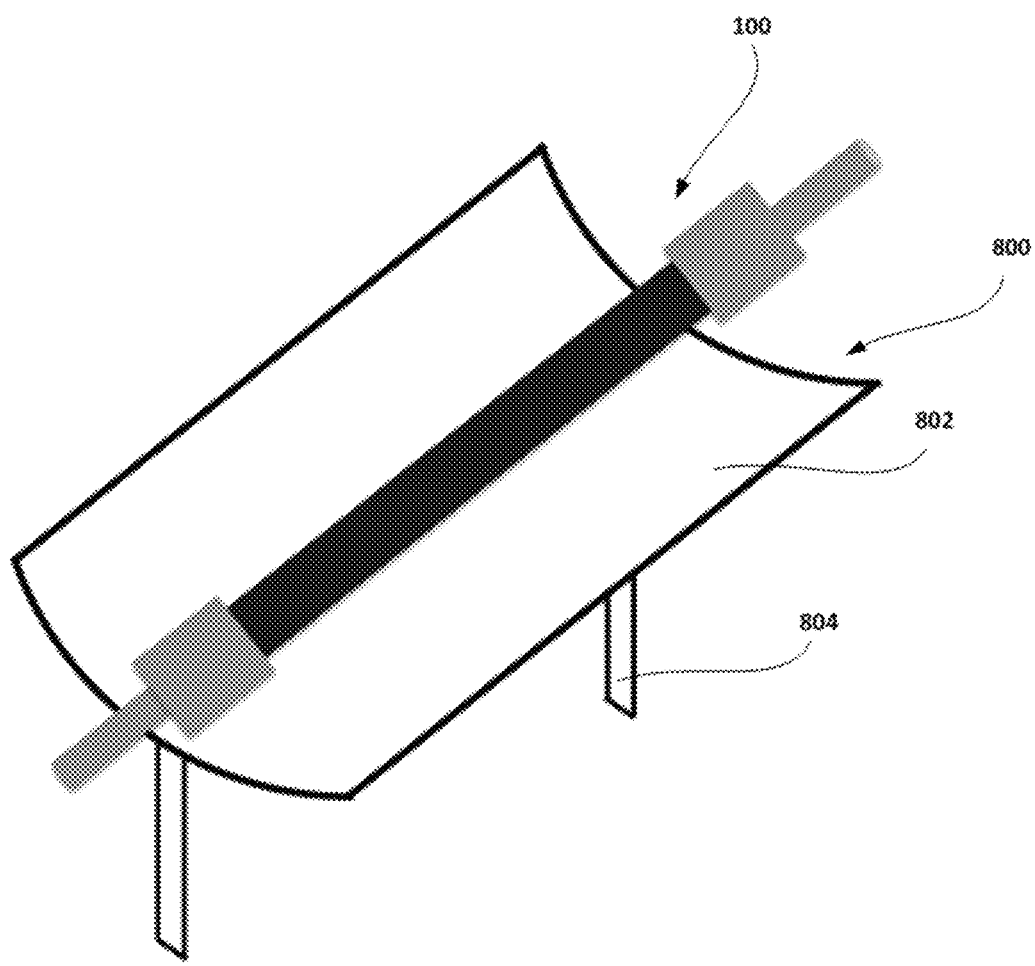
FIG. 8 is a perspective view of an example configuration of a reactor system having a solar concentrator according to one embodiment of the disclosure.

FIG. 8 illustrates one example embodiment, in which the solar concentrator is a parabolic mirror trough 800. As shown, the parabolic mirror trough 800 comprises a parabolically-shaped mirrored surface 800, curved to mathematically define a focal line to which incoming electromagnetic radiation from the sun (or other light source) reflects. The parabolic mirror trough 800 also comprises an attachment mechanism 804, such as a stand, frame, base, or other means for attaching the parabolic mirror trough 800 to an object, such as the Earth (including an object on the Earth), a vehicle, a celestial body, or a satellite, for example. The photocatalytic reactor cell is positioned to be substantially aligned along its central axis (i.e. its long axis, for an elongated cylindrical cell) to the focal line of the parabolic mirror trough.

While FIG. 8 illustrates only a single parabolic mirror trough 800 with a single photocatalytic reactor cell 100, in some embodiments, there may be more than one parabolic mirror trough with a single photocatalytic reactor cell (positioned to be substantially aligned along its central axis to a focal line of at least one of the plurality of parabolic mirror troughs), a single parabolic mirror trough with more than one photocatalytic reactor cell (positioned to be substantially parallel along their central axes to a focal line of the parabolic mirror trough), or multiple parabolic mirror troughs with multiple photocatalytic reactor cells (each positioned to be substantially parallel along its central axis to a focal line of at least one of the plurality of parabolic mirror troughs).

As an alternative to the parabolic mirror trough 800 illustrated in FIG. 8, the solar concentrator may comprise a parabolic dish, with the photocatalytic reactor cell positioned substantially at a focal point of the parabolic dish. The parabolic dish may, for example, comprise a plurality of reflective dish portions disposed adjacent to other respective reflective dish portions to form an array.

As another alternative, the solar concentrator may comprise a Fresnel reflector, where the photocatalytic reactor cell is positioned to be substantially aligned along its central axis to a focal line of the Fresnel reflector. The Fresnel reflector may comprise a Compact Linear Fresnel Reflector (CLFR), for example.

As yet another example, the solar concentrator may comprise a solar power tower configured to receive focused electromagnetic radiation from an array of movable reflectors. In such a configuration, the photocatalytic reactor cell is positioned in the solar power tower at a focal point of the array of movable reflectors, according to one embodiment.

Other solar concentrator embodiments utilizing reflectors may also be used. A flat plate collector and/or an evacuated tube collector may possibly be used in some implementations.

As an alternative to a reflector implementation for the solar concentrator, a refractor may be used. For example, the solar concentrator may comprise a refractive lens, with the photocatalytic reactor cell positioned at a focal point of the refractive lens. For example, the solar concentrator may comprise a Fresnel lens, where the photocatalytic reactor cell is positioned at a focal point of the Fresnel lens.

In the above-described embodiments, the particular solar concentrating and/or focusing elements, such as the parabolic mirror trough 800 and others, may constitute a housing or at least a portion of the housing, as otherwise described herein. As an alternative, such solar concentrating and/or focusing elements may reside within a separate housing, such as one that is at least partially optically transparent.

For each of the solar light source embodiments described above, the solar concentrator may be advantageously oriented to substantially maximize an intensity of electromagnetic radiation incident normal to the solar concentrator. In one embodiment, the length of the solar concentrator is aligned along a north-south orientation, and the reactor system may further comprise a computer-controlled solar tracking system to orient the solar concentrator to maintain an optimized angle of incidence of the electromagnetic radiation to the solar concentrator. In general, any of the solar concentrator alternatives described above may be controlled to track motion of the sun (or other light source) to substantially maximize an intensity of electromagnetic radiation incident normal to the solar concentrator.

For at least some of the solar light source embodiments described above, the photocatalytic reactor cell may advantageously have at least a portion of an interior surface of the enclosure be reflective (e.g. mirrored) in order to reflect received light back into the catalyst support 120 (see, e.g., FIG. 1A). For example, an inner/interior surface of the photocatalytic reactor cell enclosure may be mirrored opposite to the solar concentrator from the photocatalytic reactor cell. The enclosure of the photocatalytic reactor cell should be largely optically transparent, though, at least in a direction toward the solar concentrator.

While several solar light source implementations for a reactor have been described, others are possible and are intended to be within the scope of the appended claims. Moreover, the embodiments described above may have applications with light sources other than the sun, including both natural and artificial (i.e. electric) light sources.

As noted above, the reactor system comprises one or more reactor cells. The reactor cells of the disclosure comprise an optically transparent enclosure comprising at least one input and at least one output; and one or more plasmonic photocatalysts on a catalyst support disposed within the enclosure. Typically, the plasmonic photocatalyst comprises a catalyst coupled to a plasmonic material, such as through a physical, electronic, thermal, or optical coupling. The reactor cells of the disclosure are configured, upon application of a light source, to transform at least one reactant into at least one reformate.

In traditional fixed bed reactors, the catalyst beds are not optically transparent (i.e., the light does not penetrate the catalyst bed). In contrast, according to some embodiments of the disclosure, at least the support is optically transparent. In other embodiments, the reactor cells of the disclosure additionally or alternatively comprise an enclosure that is optically transparent. In some embodiments, the optically transparent enclosure has at least 50% transmittance for a predetermined light wavelength. For example, in some embodiments, the optically transparent enclosure has between about 50% to about 100% transmittance for a predetermined light wavelength; or at least 55%, or at least 60%, or at least 70%, or at least 80%, or at least 90%, or at least 95%, or even at least 98% transmittance for a predetermined light wavelength.

Advantageously, the optically transparent enclosure according to some embodiments of the disclosure may have low thermal expansion. Thus, in one embodiment, the optically transparent enclosure comprises a material having less than about $1 \times 10^{-4}/°$ K linear coefficient of thermal expansion (CTE). In another embodiment, the optically transparent enclosure comprises a material having less than about $1 \times 10^{-5}/°$ K CTE; or less than about $5 \times 10^{-6}/°$ K CTE; or less than about $3 \times 10^{-6}/°$ K CTE; or even less than about $1 \times 10^{-6}/°$ K CTE. For example, some exemplary materials with suitable CTE values include, but are not limited to, borosilicate glass at $3.2 \times 10^{-6}/°$ K, PYREX® glass at $3.2 \times 10^{-6}/°$ K, quartz at about $0.59 \times 10^{-6}/°$ K to about $9 \times 10^{-6}/°$ K, sapphire at $5.3 \times 10^{-6}/°$ K, and fused silica at $0.55 \times 10^{-6}/°$ K.

One of skill in the art will recognize than any material having the desired transmittance for a predetermined light wavelength (or range of wavelengths) and/or coefficient of thermal expansion (CTE) may be used. In some embodiments, the optically transparent enclosure comprises glass, borosilicate glass, quartz, fused quartz, aluminosilicate glass, lithium-aluminosilicate glass, sapphire, or combinations thereof.

In one embodiment, the optically transparent enclosure of the reactor cell is optically transparent on all sides of the enclosure. But one of skill in the art would appreciate that, in one embodiment, the optically transparent enclosure may not be optically transparent on all sides of the enclosure. For example, the outer cavity of the optically transparent enclosure may comprise a reflective surface facing the central cavity (which may be optically transparent).

The reactor cells of the disclosure also require one or more plasmonic photocatalysts comprising a catalyst coupled to a plasmonic material, such as through a physical, electronic, thermal, or optical coupling. Without being bound by theory, the plasmonic material is believed to act as an optical antenna capable of absorbing light due to the unique interaction of light with plasmonic materials and, as a result, generates a strong electric field on and near the plasmonic material (i.e., as a result of collective oscillation of electrons within the plasmonic material). This strong electric field on or near the plasmonic material allows for coupling between the catalyst and the plasmonic material, even when the catalyst and the plasmonic material are separated by distances of up to about 20 nm or more.

In general, the plasmonic material may be any metal, metal alloy, metalloid element, or its alloy. In some embodiments, the plasmonic material of the disclosure is selected from gold, gold alloy, silver, silver alloy, copper, copper alloy, aluminum, or aluminum alloy. In the present disclosure the term "alloys" is intended to cover any possible combination of metals. For example, the alloys may be binary alloys such as AuAg, AuPd, AgPd, AuCu, AgCu, etc., or they may be ternary alloys, or even quaternary alloys.

In some embodiments, the plasmonic material of the disclosure comprises an oxide shell surrounding a non-oxidized core. In one or more embodiments, the oxide shell may be a natural/native oxide shell that forms upon a metal or alloy's exposure to air or water. For example, a copper plasmonic material may possess a copper oxide (e.g., CuO or $Cu_2O$) shell surrounding a copper core, or an aluminum plasmonic material may possess an aluminum oxide shell surrounding an aluminum core. In some embodiments, the oxide shell may be at least partially artificially produced, such as by artificially increasing the thickness of a native/natural oxide shell by appropriate chemical methods, or by chemically synthesizing, or otherwise depositing, an oxide material around a pre-formed plasmonic material. In some embodiments, the oxide shell may have a thickness of up to about 30 nm, or up to about 25 nm, or up to about 15 nm. In some embodiments, the oxide shell may have a thickness of at least about 0.5 nm, or at least 1 nm, or at least 1.5 nm. In some embodiments, the oxide shell has a thickness ranging from about 0.1 nm to about 5 nm; or from about 0.1 nm to about 30 nm; or from about 1 nm to about 5 nm; or from about 1 nm to about 30 nm.

One of skill in the art will recognize that the size, shape, and chemical structure of the plasmonic material will affect the absorption of one or more target wavelengths. Thus, the plasmonic material or materials may be designed to maximize absorption of a target wavelength (or a set or range of target wavelengths, such as to recognize the target wavelength but have the material absorb relatively less of other, non-target wavelengths. In another example, the plasmonic material of the disclosure may be designed to catalyze a desired chemical reaction. Thus, in some embodiments, the plasmonic material may have a plasmon resonant frequency, or optical absorption maximum, in the ultraviolet to infrared region of the electromagnetic spectrum. In some embodiments, the plasmonic material has a plasmon resonant frequency in the visible light spectrum (such as at a wavelength ranging from about 380 nm to about 760 nm).

In general, the catalyst material coupled to the plasmonic material may be any compound capable of catalyzing a desired reaction (e.g., even if it were not coupled to a plasmonic material). For example, the catalyst may be capable of oxidation and reduction chemistry, water or air pollution remediation reactions, $NO_X$ and $N_2O$ decompositions, catalyzing hydrogenation reactions such as acetylene hydrogenation, carbon dioxide conversion to carbon monoxide via the reverse water-gas shift reaction (which can be coupled with a hydrogenation to create hydrocarbons using FisherTropsch synthesis), and nitrogen activation chemistry, including the synthesis of ammonia. In some embodiments, the catalyst of the disclosure may be any metal or metalloid element, and any alloy, oxide, phosphide, nitride, or combination thereof of said elements. For example, the catalyst of the disclosure may comprise catalytically active palladium, platinum, ruthenium, rhodium, nickel, iron, copper, cobalt, iridium, osmium, titanium, vanadium, indium, or any combination thereof. The catalyst of the disclosure may comprise any alloy, oxide, phosphide, or nitride of catalytically active palladium, platinum, ruthenium, rhodium, nickel, iron, copper, cobalt, iridium, osmium, titanium, vanadium, or indium. In some embodiments, the catalyst of the disclosure comprises catalytically active iron or copper. In some embodiments, the catalyst of the disclosure may be intermetallic nanoparticles, core-shell nanoparticles, or semiconductor nanoparticles (e.g., $Cu_2O$).

In some embodiments, the catalyst may be physically attached to the plasmonic material, while in other embodiments the catalyst may be separated by a small distance from the plasmonic material (but still coupled thereto, such as through a physical, electronic, thermal, or optical coupling). The separation may be either by empty space (i.e., a distinct physical separation) or the separation may be by the thin oxide layer discussed above. For example, the plasmonic material and the catalyst may be separated by a small distance when they are prepared via lithographic methods to have a distinct physical separation. In one or more embodiments, the small separation may be a distance of up to about 30 nm, or up to about 25 nm, or up to about 15 nm. In some embodiments, the separation may be at least about 0.5 nm, or at least 2 nm, or at least 5 nm, or at least 10 nm. In some embodiments, one or more catalysts may be physically attached to the surface of a single plasmonic material, which can increase the surface area available for reactions. In some embodiments, the catalyst may form a shell that surrounds the plasmonic material.

The plasmonic photocatalysts may have a diameter ranging from about 5 nm to about 300 nm. In some embodiments, the plasmonic photocatalyst of the disclosure may have a diameter ranging from about 10 nm to about 300 nm; or about 50 nm to about 300 nm; or about 80 nm to about 300 nm; or about 100 nm to about 300 nm; or about 5 nm to about 250 nm; about 10 nm to about 250 nm; or about 50 nm to about 250 nm; or about 80 nm to about 250 nm; or about 100 nm to about 250 nm; or about 5 nm to about 200 nm; about 10 nm to about 200 nm; or about 50 nm to about 200 nm; or about 80 nm to about 200 nm; or about 100 nm to about 200 nm; or about 80 nm to about 200 nm.

The reactor cells according to at least some embodiments also include one or more plasmonic photocatalysts dispersed onto a catalyst support. As with the enclosure, in some embodiments, the catalyst support has a low absorbance, and in particular, a low enough absorbance (for the particular radiation wavelength or wavelength range) so that the reactants are exposed to a sufficient amount of radiation to result in the desired catalytic effect for the particular reactor cell geometry in use.

Figure 6:
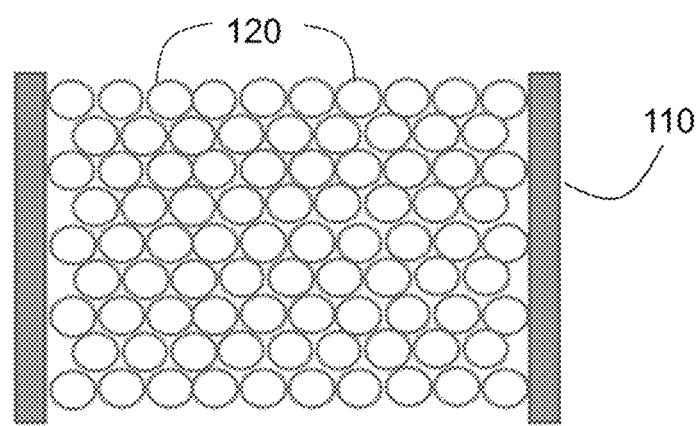
FIG. 6 is a cross-sectional detail view of an example configuration of the reactor cell having a catalyst support in bead form.

One of skill in the art will recognize that any material having the desired absorbance or transmittance for a predetermined light wavelength (or set or range of wavelengths) may be used for the catalyst support. In some embodiments, the catalyst support of the disclosure comprises silica, quartz, fused quartz, glass, borosilicate glass, aluminosilicate glass, lithium-aluminosilicate glass, sapphire, diamond, or combinations thereof. The catalyst support may be in any form known in the art, such as in the form of beads, microporous beads, fibers, spheres, pellets, cylinders (hollow or otherwise), honeycombs, or symmetrical or asymmetrical tri-quadrulobes (for example, using extrusion or tableting methods). For example, FIG. 6 illustrates a cross-sectional view of the catalyst support in the bead form. In some embodiments, the catalyst support of the disclosure may be an aerogel. Suitable aerogels include, but are not limited to, silicon dioxide aerogel, aluminum oxide aerogel, titanium dioxide aerogel, zirconium dioxide aerogel, holmium oxide aerogel, samarium oxide aerogel, erbium oxide aerogel, neodymium(III) oxide aerogel, or a combination thereof. In some embodiments, the catalyst support of the disclosure is a silicon dioxide aerogel. One of skill will recognize that when the support is an aerogel, the plasmonic photocatalyst may be dispersed throughout the aerogel (for example, the plasmonic photocatalyst may be embedded into the aerogel). In some embodiments, the catalyst support of the disclosure may be transparent aluminum oxide (such as α-phase aluminum oxide or γ-phase aluminum oxide).

The plasmonic photocatalyst may be present on the catalyst support in any amount suitable for the desired use. For example, the plasmonic photocatalyst may be present on the catalyst support in an amount between about 0.01 wt % and about 30 wt %; or about 0.01 wt % and about 80 wt %; or about 10 wt % and about 80 wt %; or about 0.01 wt % and about 70 wt %; or about 10 wt % and about 70 wt %. In some embodiments, the plasmonic photocatalyst may be present on the catalyst support in an amount between about 0.01 vol % and about 30 vol %; or about 0.01 vol % and about 20 vol %; or about 10 vol % and about 50 vol %; or about 0.01 vol % and about 70 vol %; or about 10 vol % and about 70 vol %.

In some embodiments, the plasmonic photocatalyst may be present on the catalyst support as a thin coating on the outer surface of the support (e.g., as one or a few layers). In one or more embodiments, the plasmonic photocatalyst layer that is coated onto the support may be up to about 30 nm, or up to about 25 nm, or up to about 15 nm; or at least about 0.5 nm, or at least 2 nm, or at least 5 nm, or at least 10 nm; or between about 5 nm to about 300 nm; or about 10 nm to about 300 nm; or about 50 nm to about 300 nm; or about 80 nm to about 300 nm; or about 100 nm to about 300 nm; or about 5 nm to about 200 nm; about 10 nm to about 200 nm; or about 50 nm to about 200 nm; or about 80 nm to about 200 nm; or about 100 nm to about 200 nm; or about 80 nm to about 200 nm; or about 5 nm to about 100 nm; about 10 nm to about 100 nm; or about 50 nm to about 100 nm; or about 10 nm to about 50 nm; or about 1 nm to about 50 nm.

In some embodiments, the reactor cell comprises one plasmonic photocatalyst on the catalyst support disposed within the enclosure (e.g., one type of supported plasmonic photocatalyst would be disposed within the enclosure). In some embodiments, the reactor cell comprises two or more plasmonic photocatalysts on the catalyst support disposed within the enclosure (e.g., two or more different supported plasmonic photocatalysts would be disposed within the enclosure). Two or more plasmonic photocatalysts on the catalyst support may be provided, either mixed or in distinct layers. For example, each layer would have one type of supported plasmonic photocatalyst having a desired plasmon resonant frequency and/or a desired diameter. In a non-limiting example, one layer would absorb one desired wavelength range relative to other wavelengths, the next layer would absorb another wavelength range, and the final layer (e.g., an intermediate layer) would absorb other wavelengths, such as wavelengths outside the first and second wavelength ranges.

Figure 1B:
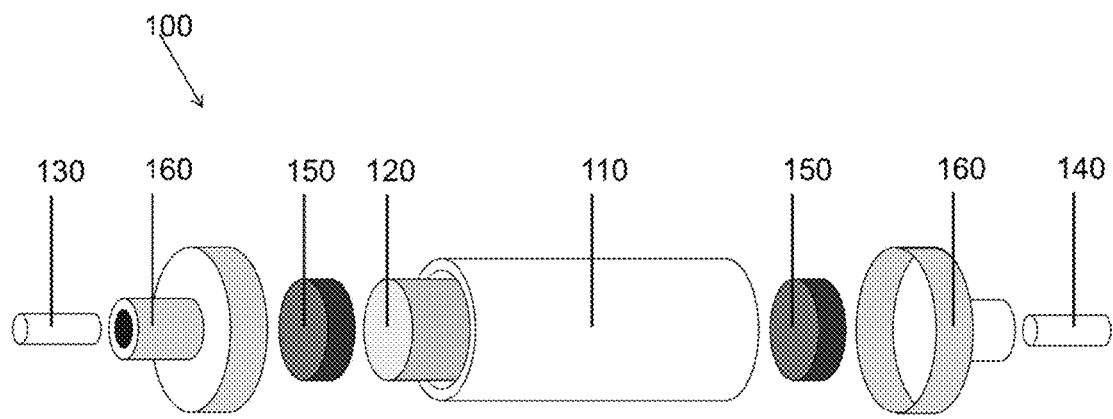
FIG. 1B is an exploded perspective side view of a reactor cell according to one embodiment of the disclosure.

In general, the reactor cell is designed to allow for illumination of the plasmonic photocatalysts with a light source. One embodiment of the reactor cell of the disclosure is shown in cross-sectional view in FIG. 1A. The same reactor cell 100 elements are also shown in exploded view in FIG. 1B. Here, a reactor cell 100 is shown comprising a plasmonic photocatalyst on a catalyst support 120 disposed within an optically transparent enclosure 110. The reactor cell 100 may further comprise fittings 160 configured to attach the cell to at least one delivery channel for at least one reactant input 130 and at least one reformate output 140. The reactor cell 100 may further comprise one or more packing support elements 150 configured to retain the catalyst within the optically transparent enclosure 110.

The size and shape of the enclosure of the reactor cell may be adapted to meet the desired need. In some embodiments, the enclosure has an inner diameter ranging from about 0.2 cm to about 10 cm; or about 0.5 cm to about 3 cm. In some embodiments, the enclosure has a length ranging from about 10 cm to about 2 m; or about 50 cm to about 1 m. The enclosure of the reactor cell may have a circular cross-section or a polygonal cross-section, for example.

As noted above, the reactor cell may further comprise one or more fittings (such as fittings 160 in FIGS. 1A-1B) configured to attach the reactor cell to at least one delivery channel for delivering the at least one reactant to or the at least one reformate from the enclosure. For example, the fittings may comprise a first fitting coupled to the reactant input and a second fitting coupled to the reformate output. The fittings of the disclosure may comprise low alloy steel, high alloy steel, chrome alloys, nickel alloys, plastics, glass, borosilicate glass, quartz, fused quartz, aluminosilicate glass, lithium-aluminosilicate glass, or combinations thereof. Depending on the need, the fittings of the disclosure may further comprise an O-ring or another sealing mechanism. Other fitting materials and/or sealing mechanisms are also possible, and are intended to be within the scope of the present disclosure.

The reactor cell may further comprise one or more packing support elements (such as packing support elements 150 in FIGS. 1A-1B) configured to retain the catalyst within the enclosure. In some embodiments, the packing support elements are provided at the input end and at the output end of the reactor cell. In some embodiments, the packing support elements are provided at the input end, the output end, and spaced throughout the reactor cell. Conventional materials for use as a packing support may be used, such as metal mesh, glass beads (having a larger diameter than the support), glass wool, monolith, polymer, or elastomer, for example.

In some embodiments, the optically transparent enclosure further comprises an outer cavity and a central cavity arranged coaxially with the outer cavity, wherein the outer cavity contains the plasmonic photocatalyst on the catalyst support and the central cavity is configured to receive a light source or a thermal management feature. In some embodiments, the light source is disposed within the central cavity of the optically transparent enclosure. In some embodiments, the light source extends along or through a length of the enclosure. Any suitable light source may be used such as, but not limited to, LED, metal halide bulb, high pressure sodium bulb, xenon lamp, incandescent bulb, fluorescent bulb, halogen bulb, HID, laser or combination thereof. Natural light, such as solar light, may also be directed into the central cavity to serve as the light source. In some embodiments, the thermal management feature is disposed within the central cavity of the optically transparent enclosure. Any thermal management feature known in the art might be used. For example, the thermal management feature may include a fluid input coupled to a first end of the central cavity and a fluid output coupled to a second end of the central cavity such that fluid may flow through the reactor cell to add or remove heat from the reactor cell; or the thermal management feature may comprise a metal rod or metal wires configured for heat conduction.

In one alternative embodiment, neither the housing of the reactor system nor the enclosure of each reactor cell need be optically transparent. In this alternative embodiment, the reactor system comprises a housing and a plurality of reactor cells each having its own light source. Since, in this embodiment, each reactor cell has its own light source, the enclosure of each reactor cell need not be optically transparent, and may instead be reflective, in order to reflect light from the light source back into the interior of the enclosure. Each reactor cell may also include an input and an output, and each reactor cell includes at least one plasmonic photocatalyst on a catalyst support disposed within the enclosure, where the plasmonic photocatalyst comprises a catalyst coupled to a plasmonic material. The reactor system may further include a distributor for distributing at least one reactant into the plurality of reactor cells via the input of each reactor cell, and an accumulator for accumulating at least one reformate from the plurality of reactor cells via the output of each reactor cell.

Another aspect provides methods for using the reactor systems to transform reactants. Specifically, the disclosure provides methods for transforming at least one reactant into at least one reformate, the method comprising: adding at least one reactant into a reactor system of the disclosure; and illuminating, via the at least one light source, an interior of the reactor system and/or reactor cell(s).

In an alternative embodiment of the methods of the disclosure, the illuminating is from a light source external to the reactor system.

In some embodiments of the method, no external heating (e.g. from a dedicated heating source) is applied. In some embodiments, the methods further comprise externally heating the reactor cell. The external heating may be accomplished via the thermal management feature as described above, or via some other heating technique.

Representative methods of the disclosure include, but are not limited to, oxidation and reduction, water or air pollution remediation reactions, $NO_x$ and $N_2O$ decompositions, hydrogenation such as acetylene hydrogenation, carbon dioxide conversion, and nitrogen activation, including the synthesis of ammonia. Some of the representative chemical transformations include:

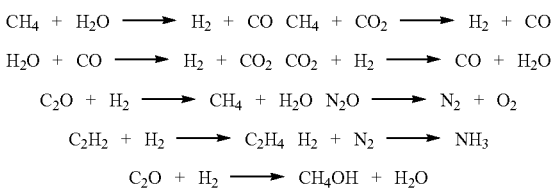

Thus, in some embodiments, the reactants are methane and water; or the reactants are methane and carbon dioxide; or the reactants are carbon monoxide and water; or the reactants are carbon dioxide and hydrogen gas; or the reactant is nitrous oxide; or the reactants are acetylene and hydrogen gas; or the reactants are hydrogen gas and nitrogen gas; or the reactants are carbon dioxide and hydrogen gas.

The methods of the disclosure may be performed at any suitable temperature. For example, in some embodiments, the methods of the disclosure are performed at a temperature ranging from about 100° ° C. to about 300° C.; or about 100° C. to about 250° C.; or about 100° C. to about 200° C.; or about 150° C. to about 300° C.; or about 150° ° C. to about 250° C.; or about 150° C. to about 200° C.; or about 200° C. to about 300° C.; or about 200° C. to about 250° C.; or about 180° ° C. to about 220° C.; or about 190° C. to about 210° C.; or about 20° C. to about 300° C.; or about 20° C. to about 250° C.; or about 20° C. to about 200° C.; or about 20° C. to about 150° C.; or about 20° C. to about 100° C.

The methods of the disclosure may be performed at any suitable pressure. For example, in some embodiments, the methods of the disclosure are performed at a pressure ranging from about 14 psi to about 300 psi, or about 14 psi to about 200 psi, or about 14 psi to about 100 psi, or about 14 psi to about 50 psi, or about 100 psi to about 300 psi, or about 100 psi to about 200 psi.

In the methods of the disclosure, the reactants might be introduced into the reactor system at any suitable temperature. In some embodiments, the reactant has temperature ranging from about 200° ° C. to about 300° C.; or about 200° C. to about 270° C.; or about 200° C. to about 250° C.; or about 230° C. to about 270° C., when introduced into the reactor cell.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

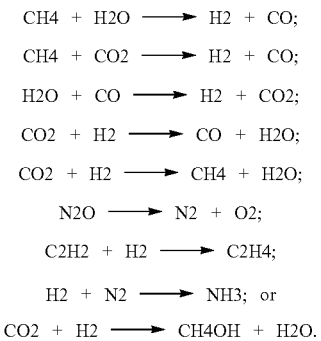

The invention claimed is:

1. A method for transforming at least one reactant into at least one reformate, the method comprising:
distributing the at least one reactant into a plurality of fixed-bed reactor cells disposed within an interior of a housing, wherein each of the plurality of fixed-bed reactor cells comprises an optically transparent enclosure and a plasmonic photocatalyst on a catalyst support disposed within the optically transparent enclosure;
illuminating, via at least one light source, the interior of the housing, wherein the at least one light source is disposed within the interior of the housing and adjacent to each of the plurality of fixed-bed reactor cells such that the at least one light source directly imparts light to each of the plurality of fixed-bed reactor cells and wherein upon illumination, each of the plurality of fixed-bed reactor cells are configured to transform the at least one reactant into the at least one reformate via the at least one reactant reacting with the plasmonic photocatalyst; and
accumulating the at least one reformate from the plurality of fixed-bed reactor cells.

2. The method of claim 1, wherein the housing comprises a reflective interior surface from which the light from the at least one light source is reflected into the plurality of fixed-bed reactor cells.

3. The method of claim 1, wherein the optically transparent enclosure of each of the plurality of fixed-bed reactor cells comprises an outer cavity and a central cavity arranged coaxially with the outer cavity, wherein the outer cavity of each of the plurality of fixed-bed reactor cells contains the plasmonic photocatalyst on the catalyst support and the central cavity of each of the plurality of fixed-bed reactor cells contains the at least one light source, and wherein the illuminating is from the at least one light source contained in the central cavity of each of the plurality of fixed-bed reactor cells.

4. The method of claim 1, wherein the optically transparent enclosure of each of the plurality of fixed-bed reactor cells comprises an outer cavity and a central cavity arranged coaxially with the outer cavity, wherein the outer cavity of each fixed-bed reactor cell contains the plasmonic photocatalyst on the catalyst support and the central cavity of each reactor cell contains a thermal management feature.

5. The method of claim 1, further comprising heating the plurality of fixed-bed reactor cells via the at least one reactant reacting with the plasmonic photocatalyst in each of the plurality of fixed-bed reactor cells.

6. The method of claim 1, wherein the at least one light source is also disposed external to the housing, wherein the housing is at least partially optically transparent, and wherein illuminating the interior of the housing includes directing electromagnetic radiation from the at least one light source through the housing and into the plurality of fixed-bed reactor cells.

7. The method of claim 4, further comprising heating, via the thermal management feature in each of the plurality of fixed-bed reactor cells, the plurality of fixed-bed reactor cells to assist in transforming the at least one reactant into the at least one reformate, wherein heating comprises supplying fluid from a fluid input coupled to a first end of the central cavity of each of the plurality of fixed-bed reactor cells to a fluid output coupled to a second end of the central cavity of each of the plurality of fixed-bed reactor cells, such that the fluid heats each of the plurality of fixed-bed reactor cells.

8. The method of claim 1, wherein transforming the at least one reactant into the at least one reformate comprises at least one of the desired chemical reactions selected from a group consisting of: